(12) United States Patent
Felt

(10) Patent No.: US 9,955,125 B2
(45) Date of Patent: Apr. 24, 2018

(54) BICYCLE HANDLEBAR VIDEO SYSTEM

(71) Applicant: FELT RACING, LLC, Irvine, CA (US)

(72) Inventor: James Michael Felt, Auburn, CA (US)

(73) Assignee: Felt Racing, LLC, Rancho Santa Margarita, CA (US)

( * ) Notice: Subject to any disclaimer, the term of this patent is extended or adjusted under 35 U.S.C. 154(b) by 482 days.

(21) Appl. No.: 14/562,985

(22) Filed: Dec. 8, 2014

(65) Prior Publication Data

US 2015/0092060 A1     Apr. 2, 2015

Related U.S. Application Data

(63) Continuation of application No. 12/257,124, filed on Oct. 23, 2008, now abandoned.

(51) Int. Cl.
| | |
|---|---|
| *H04N 7/18* | (2006.01) |
| *B62J 99/00* | (2009.01) |
| *B62K 21/12* | (2006.01) |

(52) U.S. Cl.
CPC ............. *H04N 7/185* (2013.01); *B62J 99/00* (2013.01); *B62K 21/12* (2013.01); *Y10T 74/20822* (2015.01)

(58) Field of Classification Search
CPC ................................ H04N 7/185; B62K 21/12
USPC ......................................................... 348/148
See application file for complete search history.

(56) References Cited

U.S. PATENT DOCUMENTS

| | | | |
|---|---|---|---|
| 2,445,203 A | 7/1948 | Bowers | |
| 3,804,495 A | 4/1974 | Rayow et al. | |
| 4,229,836 A | 10/1980 | Stinger | |
| 4,375,316 A | 3/1983 | Le Vantine | |
| 4,564,959 A | 1/1986 | Zahn | |
| 4,581,776 A | 4/1986 | Kie | |

(Continued)

FOREIGN PATENT DOCUMENTS

| | | |
|---|---|---|
| DE | 3144872 | 9/1983 |
| DE | 10212516 | 10/2003 |

(Continued)

OTHER PUBLICATIONS

Wikipedia, Graeme Obree, http://en.wikipedia.org/wiki/Graeme_Obree, Aug. 24, 2012, pp. 1-2.

*Primary Examiner* — Philip B Tran
(74) *Attorney, Agent, or Firm* — Stetina Brunda Garred and Brucker

(57) ABSTRACT

A bicycle video system for facilitating improved aerodynamic positioning of a bicyclist. The bicycle video system includes a video display. The video display is used by the bicyclist to view an area in front of the bicycle. The video display allows the bicyclist to ride while maintaining a lowered head position to see an area in front of the bicycle. The bicycle video system also includes a video camera. The video camera is in electrical communication with the video display. The video camera is positioned in a direction toward an area in front of the bicycle to capture images in front of the bicycle. The video camera may transmit a video signal representative of a real-time image of an area in front of the bicycle to the video display. The video display may continuously receive real-time images of an area in front of the bicycle.

18 Claims, 3 Drawing Sheets

(56) References Cited

U.S. PATENT DOCUMENTS

| | | |
|---|---|---|
| 4,647,165 A | 3/1987 | Lewis |
| 4,679,916 A | 7/1987 | Roller et al. |
| 4,903,350 A | 2/1990 | Gentes |
| 4,995,117 A | 2/1991 | Mirage |
| 5,088,130 A | 2/1992 | Chiarella |
| 5,138,901 A | 8/1992 | Dabandjian et al. |
| 5,173,970 A | 12/1992 | Shifrin |
| 5,243,417 A | 9/1993 | Pollard |
| 5,305,153 A | 4/1994 | Kochocki |
| 5,467,906 A | 11/1995 | Forman |
| D370,193 S | 5/1996 | Shull |
| 5,590,209 A | 12/1996 | Pratt et al. |
| 5,659,900 A | 8/1997 | Arney et al. |
| 5,675,843 A | 10/1997 | Grim et al. |
| 5,760,865 A | 6/1998 | Webster |
| 6,293,449 B1 | 9/2001 | McGuire et al. |
| 6,615,648 B1 | 9/2003 | Ferguson et al. |
| 6,634,758 B2 | 10/2003 | Preis et al. |
| 6,729,778 B1 | 5/2004 | Wu et al. |
| 6,795,977 B2 | 9/2004 | Basson et al. |
| 7,535,086 B2 | 5/2009 | Merilo et al. |
| 2001/0039850 A1 | 11/2001 | Masui et al. |
| 2004/0117896 A1 | 6/2004 | Madey et al. |
| 2004/0143879 A1 | 7/2004 | Robertson |
| 2006/0026741 A1 | 2/2006 | Lang-Ree et al. |
| 2006/0232389 A1 | 10/2006 | Chu |
| 2007/0160364 A1* | 7/2007 | Peika ............... F16M 11/14 396/428 |
| 2008/0239080 A1* | 10/2008 | Moscato ............ A42B 3/0426 348/148 |
| 2010/0005636 A1* | 1/2010 | Liao ..................... A42B 3/04 24/652 |
| 2010/0171832 A1 | 7/2010 | Solida |
| 2010/0194130 A1 | 8/2010 | Bartolome Garcia et al. |

FOREIGN PATENT DOCUMENTS

| | | |
|---|---|---|
| DE | 202004010481 | 12/2004 |
| DE | 202006010501 | 8/2006 |
| EP | 0650673 | 3/1995 |
| JP | 2003113522 | 4/2003 |
| JP | 2006/103600 | 4/2006 |

* cited by examiner

BICYCLE HANDLEBAR VIDEO SYSTEM

CROSS-REFERENCE TO RELATED APPLICATIONS

This application is a continuation of U.S. patent application Ser. No. 12/257,124 filed on Oct. 23, 2008, the entire contents of which are incorporated herein by reference.

STATEMENT RE: FEDERALLY SPONSORED RESEARCH/DEVELOPMENT

Not Applicable

BACKGROUND

1. Technical Field of the Invention

The present invention relates to a bicycle handlebar and, more particularly, a bicycle handlebar having a video system configured to facilitate the reduction of aerodynamic drag associated with a riding position on a bicycle.

2. Description of the Related Art

The sport of cycling is continuously growing. Cycling is enjoyed by many people who participate at various levels. There are professional and amateur bicyclists' who participate in competitions, some bicyclist ride recreationally, and other's for the exercise. A common goal across the sport of cycling includes maximizing the aerodynamic efficiency of the bicyclist and the bicycle to achieve faster speeds, greater control and better overall results. In the sport of cycling, a fraction of a second can have a profound impact on the outcome of a race. The power generated by a bicyclist has its human limitations. Aerodynamics is an area where cycling enthusiasts and researchers alike look to improve performance. The main obstacle to aerodynamic efficiency at high speeds is wind resistance. Every bicyclist has to overcome wind resistance. Most recreational bicycles in which the bicyclist is seated in an upright riding position have very poor aerodynamics. While new bicycles are being designed with better aerodynamics in mind, the human body is simply not well designed to maneuver through air. Bicycling enthusiasts have been keenly aware of the problem of wind resistance and over the years have developed techniques for enhancing the aerodynamic efficiency of the bicycle and the bicyclist.

Aerodynamic drag consists of two forces: air pressure drag and direct friction (skin friction). A blunt, irregular object such as the human body disturbs the air flowing around it, forcing the air to separate from the body's surface. Low pressure regions from behind the body result in a pressure drag against the body. With high pressure in the front, and low pressure behind, the bicyclist is literally being pulled backwards. Streamlined designs help the air close more smoothly around the body and reduce pressure drag. Direct friction occurs when wind comes into contact with the outer surface of the bicyclist and the bicycle. Racing bicyclists often wear special skin tight suits in order to reduce direct friction. Direct friction is less of a factor than air pressure drag.

Aerodynamic drag plays an important role in cycling. For example, at speeds of 8 mph or greater the aerodynamic drag of a bicycle and rider is greater than the rolling resistance. When the speed is increased to 20 mph, the aerodynamic drag is more than 80% of the total drag. There are several areas for aerodynamic improvement. The most important area is associated with the positioning of the bicyclist. The bicyclist may account for 65% to 80% of the drag. Therefore, the bicyclist's position is very important to the overall aerodynamics. Research using wind tunnels and coast down tests has shown that proper body position can reduce drag by 31% over an upright riding position. The farther forward (closer to front wheel) the center of mass of the combined bicyclist and bicycle, the less the front wheel has to move laterally in order to maintain balance. Conversely, the further back (closer to the rear wheel) the center of mass is located, the more front wheel lateral movement or bicycle forward motion will be required to regain balance. In order to move forward, the bicyclist must push through the mass of air in front. Moving forward through the mass of air requires energy. Aerodynamic efficiency (a streamlined shape that cuts through the air more smoothly) enables a bicyclist to travel much faster, with less effort. But the faster the bicyclist is traveling, the more wind resistance is experienced, and the more energy is required to overcome the resistance. When bicyclists aim to reach high speeds, they focus not only on greater power, which has its human limitations, but also on greater aerodynamic efficiency.

The aid of technology has enabled many improvements to the bicycle components for reducing aerodynamic drag. In addition to the components, accessories have gained from special designs configured to reduce the aerodynamic drag. One example is the use of a helmet which can help to decrease the aerodynamic drag that a bicyclist encounters. An aerodynamic bicycle helmet may reduce the drag by approximately 2% over a bicyclist with no helmet. Also improvements to the bicycle handlebar such as using an airfoil design has helped maximize aerodynamic efficiency. While improvements to frames and components have improved aerodynamic performance, the bicyclist remains the largest obstacle to dramatic improvement. Riding position is important because the human body is not inherently streamlined. However, certain riding positions contort the human body into a more streamlined position. Some bicycles include "drop bars" to facilitate a position to minimize the front area of the bicyclist. Minimizing the front area reduces the amount of resistance that must be overcome by the bicyclist. Less resistance translates into increased speed and efficiency. The drop bars enable the bicyclist to shift his or her center of mass closer to the front wheel.

With reference to FIG. 1, a bicyclist sitting in a crouched position on the bicycle is provided. The improvement in aerodynamic efficiency over the bicyclist sitting upright on the bicycle is well known in the art. However, even in the crouched position the bicyclist may experience significant wind resistance. The line of sight of the bicyclist is straight ahead to an area in front of the bicycle. As a result, the front portion of the bicyclist's head blocks the wind and experiences increased resistance as speed increases. Therefore, the front portion of the bicyclist's head is an area of high pressure. Conversely, the area directly behind the head is an area of low pressure due to the front portion blocking the wind. The pressure difference between the front and back portion of the head generates a dragging force pulling the bicyclist backward. Referring now to FIG. 2, the bicyclist's line of sight is downward instead of straight ahead in front of the bicycle. The change in position of the bicyclist's head reduces the front area that experiences wind resistance. As a result, the pressure difference between the front and back portion of the bicyclist's head is significantly reduced. Thus, the bicyclist's position corresponds to increased aerodynamic efficiency.

However, there is a delicate balance between the most efficient riding position (one which reduces drag) and comfort and safety of the rider. Some positions that may result in enhanced aerodynamic efficiency may not be practical due to safety concerns or simply the comfort of the bicyclist. The balance arises from the general limitations of the human body that must be considered. As described above, the reduction of the bicyclist's frontal area reduces the amount of resistance that must be overcome. One way to accomplish this is a lowered head position where the head is positioned such that the line of sight is directed downward. The lowered head position is impractical because it reduces the bicyclist's ability to see the area in front of the bicycle. This position may put the bicyclist at an increased risk of injury due to the limited line of sight. The bicyclist may be more prone to an accident or collision.

Accordingly, there exists a need in the art for a bicycle video system which addresses one or more of the above or related deficiencies.

BRIEF SUMMARY

A bicycle video system is provided for facilitating an aerodynamic positioning of a bicyclist. The bicycle video system includes a video display. The video display is used by the bicyclist to view an area in front of the bicycle. The video display allows the bicyclist to ride while maintaining a lowered head position instead of a raised head position to see the area in front of the bicycle that may be viewed by the bicyclist. The video display may be positioned in a plurality of locations as long as the video display enables the bicyclist to ride with a lowered head position. The bicycle video system also includes a video camera. The video camera is in electrical communication with the video display. The video camera is positioned in a direction toward the front of the bicycle to capture images in front of the bicycle. The video camera may transmit a video signal representative of a real-time image of an area in front of the bicycle to the video display. As a result, the video display may constantly receive real-time images of an area in front of the bicycle enabling the bicyclist to maintain a lowered head position for better aerodynamics.

In a first embodiment, a bicycle video system includes a bicycle handlebar. The bicycle handlebar defines a top surface. The bicycle handlebar is also configured for attachment to a bicycle frame. In this regard, the bicycle video system is incorporated into the bicycle handlebar. The bicycle video system includes a video display coupled to the top surface of the bicycle handlebar. A video camera is coupled to the bicycle handlebar. The video camera is directed towards an area in front of the bicycle handlebar. The video display and the video camera are in electrical communication with each other. The video display receives a signal representative of a real-time image generated by the video camera. Through the use of a video camera and a video display, the bicycle handlebar facilitates a lowered head riding position on the bicycle which minimizes the pressure drag associated with the bicyclist. The video camera feeds real time images directly to the video display for immediate observation. Because the video camera is disposed on the bicycle handlebar, the video camera is able to capture real time images directly in front of the bicycle similar to the views of a bicyclist riding with a raised head position.

Without the video camera and the video display, the bicyclist may be inclined to keep his or her head elevated to view the area in front of the bicycle. However, the elevated head of the bicyclist generates a high pressure region in front of the bicyclist's head. This is caused by the wind contacting the surface area of the bicyclist's head. Conversely, the region directly behind the bicyclist's elevated head is a low pressure region because the front surface area of the bicyclist's head blocks the wind. The pressure difference between the front and rear portion of the elevated head results in back pressure drag that negatively affects the aerodynamic efficiency of the bicyclist. The video camera and the video display disposed on the bicycle handlebar allow the bicyclist to maintain a lowered head position while viewing the area in front of the bicycle on the video display. The lowered head position minimizes the pressure difference between the front and rear portion of the head, resulting in a streamlined position. The pressure at the front portion of the lowered head is minimized because less surface area is exposed to the wind resistance.

In more detail, the bicycle handlebar may include an elongated body with a first end and a second opposing end. The elongated body defines a longitudinal axis extending along the elongated body from one opposing end to the other opposing end. Additionally, the elongated body of the handlebar includes a central area generally equidistant from the first end and the second opposing end. The bicycle handlebar may also include a handlebar stem configured to extend away from the central area of the elongated body. The elongated body and the handlebar stem may form a unitary piece comprising the bicycle handlebar. The handlebar stem may define a stem axis orthogonal to and intersecting the longitudinal axis. The stem axis is configured to generally align with the bicycle frame when the bicycle handlebar is attached to the bicycle frame. In this regard, the handlebar stem is connectable to the bicycle frame. The handlebar stem may be connected to the bicycle frame by a screw fastener or any other well known method in the art. The shape of the bicycle handlebar may be defined by the outer periphery of the elongated body and the handlebar stem. A video camera is coupled to the outer periphery of the elongated body of the handlebar. The video camera is coupled to the elongated body such that the video camera lens is directed toward an area in front of the bicycle handlebar and away from the bicycle frame. The bicycle handlebar also includes a video display disposed within the central area of the elongated body. The video display is positioned adjacent the handlebar stem.

The handlebar stem may be connected to the bicycle frame via a bicycle fork also known as the front fork. The front fork is the portion of the bicycle that holds the front wheel and allows the rider to steer and balance the bicycle. The first end and the second opposing end of the elongated body may also include a pair of handlebar grips attached thereto.

The video camera may also be disposed within the outer periphery of the elongated body along the stem axis spaced substantially equidistant from the first and second opposing end of the elongated body. The placement of the video camera enables the viewing by the video camera resembling the area viewed by the bicyclist with an elevated head position and a line of sight in the forward direction. Additionally, the video display may be pivotally coupled to the elongated body. As a result, the position of the video display is adjustable. For example the video display may be adjustable between 0 and 45 degrees relative to the elongated body. However, it is preferred that the video display is flush with the elongated body to minimize drag experienced by the bicycle handlebar. The video display is configured to receive a continuous signal representative of real-time images generated and transmitted by the video camera. The video camera and the video display may be battery powered.

In a second embodiment of the system, a handlebar mounted bicycle video system is provided. The bicycle handlebar mount is configured to attach to a bicycle handlebar. In this regard the mount may be a clamp or any similar device used to attach to the bicycle handlebar. The mount is configured to rigidly attach to the bicycle handlebar. A video camera is disposed within the bicycle handlebar mount. The video camera is positioned in a manner such that the video camera is directed toward an area in front of the bicycle handlebar. The video camera is configured to capture real time images similar to the image a bicyclist with an elevated head position may view. The handlebar mounted bicycle video system also includes a flexible shaft. The flexible shaft extends from the bicycle handlebar mount. The flexible shaft includes a proximal end and a distal end. The proximal end of the flexible shaft is coupled to the bicycle handlebar mount. A video display is also associated with the handlebar mounted bicycle video system. The video display is in electrical communication with the video camera for receiving a signal representative of real time images of the area in front of the bicycle handlebar. The video display is coupled to the distal end of the flexible shaft. The configuration of the flexible shaft allows for the video display to be positioned wherein the bicyclist may view the video display while minimizing aerodynamic drag associated with the riding position. Furthermore, the flexible shaft may be adjusted to change the positioning of the video display.

In another embodiment, a method of displaying a real-time image generated by a video camera coupled to a bicycle frame is provided. A video display is coupled to a bicycle handlebar attached to the bicycle frame. The method includes positioning the video camera in a direction forward of the bicycle frame. The method continues by optically sensing a scene forward of the bicycle frame using the video camera coupled to the bicycle frame. The video camera may defines a viewing axis parallel to the scene forward of the bicycle. The video signal generated by the video camera is transmitted to the video display. The video display may be positioned adjacent to the viewing axis such that the bicyclist may look down to view the video display. The video display is configured to display real time images in response to receiving the video signal from the video camera. The method enables the bicyclist to maintain a lowered head position. Without a continuous display of real time images of an area forward of the bicycle the bicyclist may be less inclined to maintain a lowered head position.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 3:
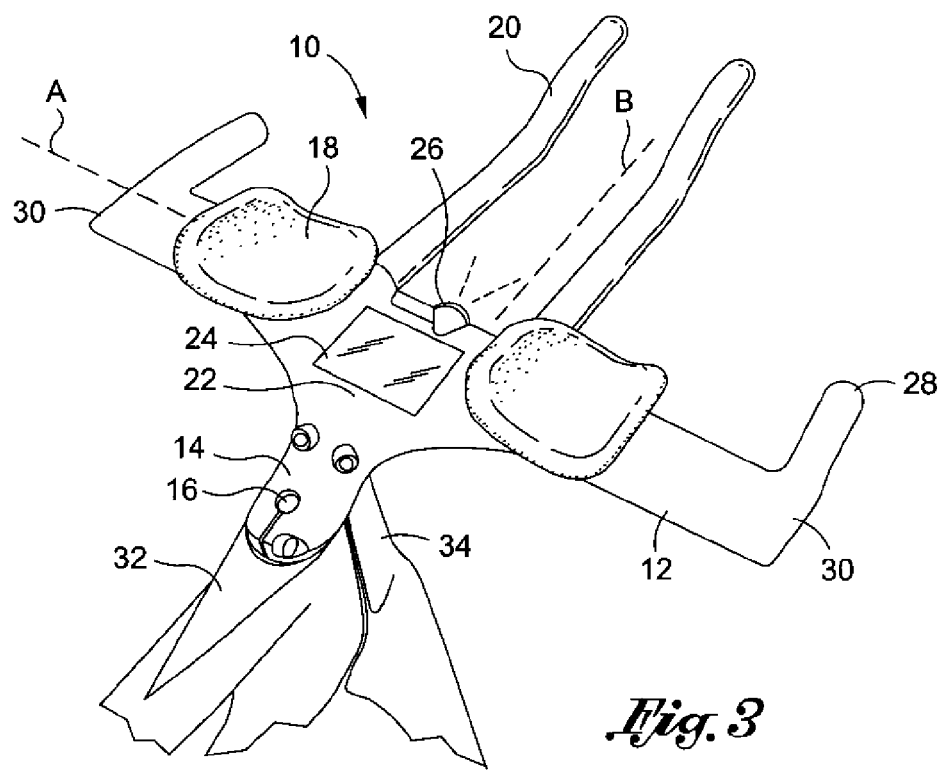
FIG. 3 is a perspective view of a bicycle video system in accordance with a first embodiment of the present invention.

Referring now to FIG. 3, the bicycle video system 10 is incorporated into a bicycle handlebar 12. The bicycle handlebar 12 enables the bicyclist to ride the bicycle while maintaining a lowered head position. The lowered head position is associated with the bicyclist looking in a downward direction towards the bicycle handlebar 12. Maintaining the lowered head position as opposed to an elevated head position enhances the aerodynamic efficiency of the bicyclist. Furthermore, the bicycle handlebar 12 enables the bicyclist to maintain a lowered head position while viewing a video display 24 that may display real-time images of views similar to a bicyclist with an elevated head position. The elevated head position may correspond to a line of sight directed toward an area to be traversed by the bicycle. When the head is elevated the surface area exposed to wind resistance may be greater than the surface area exposed to wind resistance for a lowered head position. As a result, the surface area exposed to the wind resistance may correspond to a high pressure zone. The surface area blocks the wind resistance and may create a low pressure region behind the head of the bicyclist. The pressure differential has an adverse effect on potential speed and efficiency.

The bicycle handlebar 12 may include an elongated body. The elongated body of the bicycle handlebar 12 may include an airfoil shape to minimize drag as a result of wind interfacing with the bicycle handlebar 12. The bicycle handlebar 12 includes a first end 30 and a second opposing end 30. A pair of handlebar grips 28 may be attached to the opposing ends 30 of the bicycle handlebar 12. In one embodiment, a pair of drop bar grips may be coupled or attached to the opposing ends 30. The drop bar grips extend downward such that when the bicyclist engages the grips the center of mass of the bicyclist is positioned closer to the front wheel of the bicycle. The bicycle handlebar 12 may also define a longitudinal axis A. The pair of handlebar grips 28 may extend perpendicular or orthogonal to the longitudinal axis A. In another embodiment, the pair of handlebar grips 28 is molded with the elongated body of the bicycle handlebar 12 to form a unitary molded bicycle handlebar 12 for attachment to a bicycle frame 32.

The bicycle handlebar 12 may also include a pair of arm pads 18 affixed to a top surface defined by the bicycle handlebar 12. A pair of bar extensions 20 may also be coupled to the elongated body of the bicycle handlebar 12. The pair of bar extensions 20 is configured to extend away from the bicycle handlebar 12 towards an area in front of the bicycle. Both the pair of arm pads 18 and the pair of bar extensions 20 may be used to facilitate a riding position on the bicycle that maximizes aerodynamic efficiency by positioning the center of mass of the bicyclist closer to the front wheel.

The elongated body of the bicycle handlebar 12 may also include a central surface area 22 equidistantly spaced from the opposing ends 30. The central surface area 22 is generally aligned with the bicycle frame 32. The bicycle handlebar 12 is configured for attachment to the bicycle frame 32. The central surface area 22 of the bicycle handlebar 12 is configured to be generally aligned with the center of a bicyclist's body such that the video display 24 is adjacent to the face of the bicyclist when the bicyclist enters a lowered head position. The bicycle handlebar 12 includes a handlebar stem 14 extending from the elongated body. The handlebar stem 14 is adjacent the central surface area 22 of the elongated body of the bicycle handlebar 12 and configured to extend away from the area in front of the bicycle. In one embodiment, the handlebar stem is molded with the elongated body of the bicycle handlebar 12 to form a unitary bicycle handlebar component. In this regard, the bicycle handlebar 12 may be manufactured from one continuous body. The handlebar stem 14 and the elongated body of the bicycle handlebar 12 may define an outer peripheral edge.

The handlebar stem 14 is the portion of the bicycle handlebar 12 that is attached to the bicycle frame 32. In particular, the handlebar stem 14 may be coupled to a front fork 34 attached to the bicycle frame 32. The front fork 34 is the portion of the bicycle that holds the front wheel and allows the bicyclist to steer and balance the bicycle. The bicycle handlebar 12 is attached to the front fork 34 via the handlebar stem 14. The handlebar stem 14 may include a plurality of apertures 16 configured to receive a screw or fastener for coupling the bicycle handlebar 12 to the bicycle frame 32 and the front fork 34. However, other well known methods for coupling the handlebar stem 14 to the bicycle frame 32 and/or the front fork 34 are contemplated.

Figure 1:
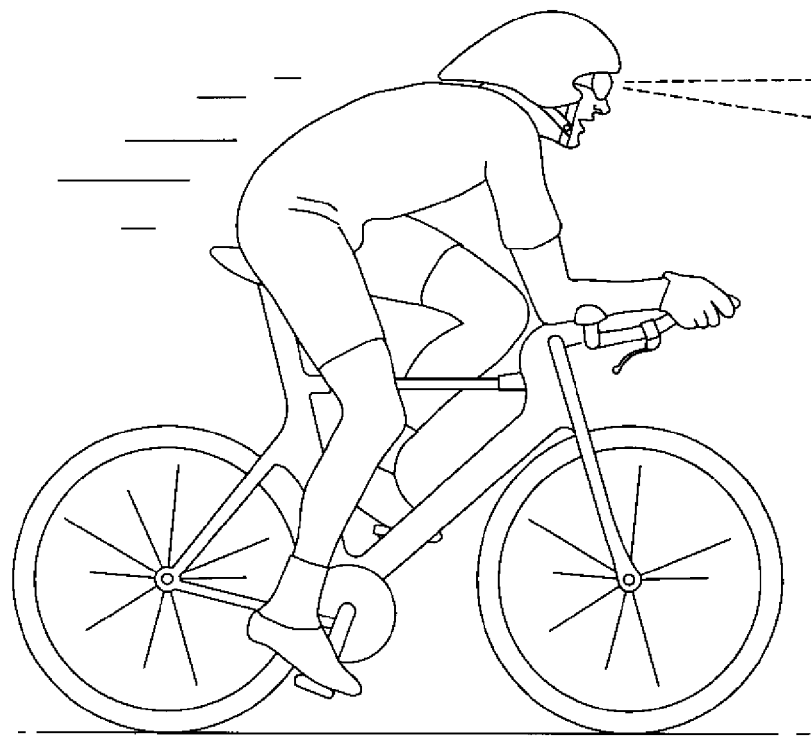
FIG. 1 is a perspective view of a bicycle rider with an elevated head position.

Still referring to FIG. 3, a video camera 26 is provided. The video camera may be coupled to the peripheral edge of the bicycle handlebar 12. The video camera 26 is positioned such that the video camera 26 may include a line of sight defining a line of sight axis B. The line of sight axis B extends toward an area in front of the bicycle handlebar 12 and may be orthogonal to the longitudinal axis A. The video camera 26 may be installed in a plurality of locations on the bicycle handlebar 12. The video camera 26 may be placed along the outer periphery of the bicycle handlebar 12 as long as the video camera 26 is directed toward the area in front of the bicycle handlebar 12. In one embodiment, the video camera 26 may be embedded within the bicycle handlebar 12 at a point equidistant from the opposing ends 30. In this regard, the video camera 26 is positioned adjacent the central surface area 22 of the elongated body of the bicycle handlebar 12. When the video camera 26 is positioned adjacent the central surface area 22, the optical image of the area in front of the bicycle handlebar 10 may closely resemble the view associated with a bicyclist riding with an elevated head position. Advantageously, the video camera 26 may provide views similar to the views of the bicyclist provided in FIG. 1. The video camera 26 may also incorporate a wide angle lens to capture the area in front of the bicycle handlebar 12 that may be outside the peripheral vision of the bicyclist. In another embodiment, the video camera 26 is coupled to an actuator disposed within the bicycle handlebar 12. The actuator allows the video camera 26 to adjust the direction of the lens. The actuator may be in electrical communication with a sensor configured to send a signal for positioning the video camera 26.

The bicycle video system 10 may include the video display 24 incorporated into the bicycle handlebar 12. The video display 24 is in electrical communication with the video camera 26. The video display 24 may be disposed within the elongated body of the bicycle handlebar 12 adjacent the central surface area 22. The video display 24 may be disposed equidistantly spaced from the opposing ends 30. The video display 24 may be positioned to substantially align with the handlebar stem 14. The position of the video display 24 is configured to be easily viewable by the bicyclist in the lowered head position looking downward towards the bicycle handlebar 12 or the handlebar stem 14. The video display 24 by way of example is a liquid crystal display (LCD). However, other well known technologies including cathode ray tube (CRT), plasma, and the like may be used for the video display 24. In one embodiment, the video display 24 is encapsulated within the elongated body of the bicycle handlebar 12. The encapsulation may protect the video display 24 from scratching, cracking or other types of damage. In another embodiment, the video display 24 is pivotally coupled to the surface of the bicycle handlebar 12. This allows the video display 24 to be adjusted at different angles relative to the bicycle handlebar 12.

Figure 2:
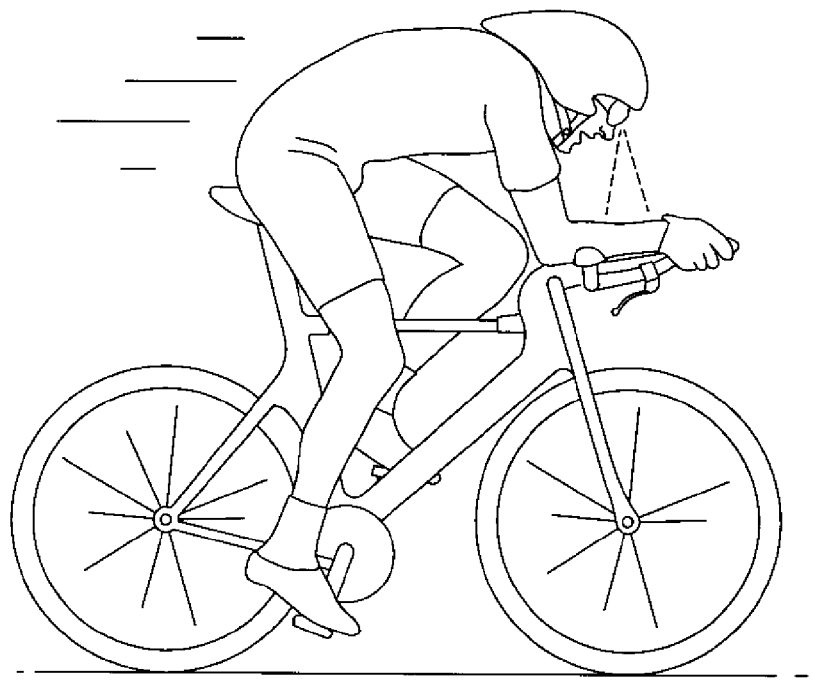
FIG. 2 is a perspective view of a bicycle rider with a lowered head position.

The video display 24 is configured to receive a video signal from the video camera 26. Subsequent to receiving the video signal, the video display 24 displays real-time images of the general area in front of the bicycle handlebar 12 generated by the video camera 26. The video display 24 may continuously display the real-time images received from the video camera 26 through the video signal. This may allow the bicyclist to focus on the video display 24 and maintain a streamlined aerodynamically efficient position similar to the position shown in FIG. 2. The video display 24 allows the bicyclist to immediately observe the optical images captured by the video camera 26. The video display 24 may also be configured to display the speed of the bicycle, distance traveled, time elapsed, and various other variables associated with the bicycle and the bicyclist. A battery (not shown) is used to power the video camera 26 and the video display 24. Additionally, a power switch (not shown) is used to power the video camera 26 and the video display 24 on and off. In another embodiment, the bicycle pedals are connected to a power electronics converter. The power electronics converter is in electrical communication with the video camera 26 and the video display 24. The pedaling action produces energy which is converted into the electricity necessary to power both the video camera 26 and the video display 24.

Figure 4:
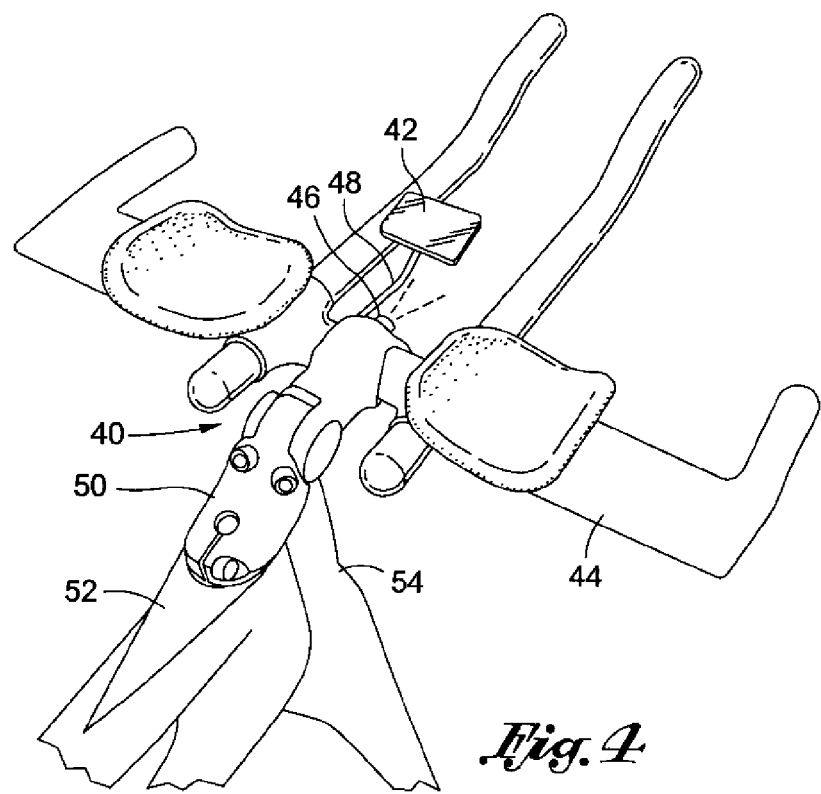
FIG. 4 is a perspective view of the bicycle video system in accordance with a second embodiment of the present invention.

Referring now to FIG. 4, the bicycle video system 10 is incorporated within a bicycle handlebar mount 40 representative of a second embodiment is provided. The bicycle handlebar mount 40 is configured to couple to the bicycle handlebar 44. The handlebar mount 40 may be coupled to the bicycle handlebar 44 at a midpoint along the bicycle handlebar 44, such that the handlebar mount 40 is generally aligned with the handlebar stem 50, the bicycle frame 52, and the front fork 54. The handlebar mount 40 may also be coupled to the handlebar stem 50. The handlebar mount 40 is configured to clamp onto the bicycle handlebar 44. A fastener, screw, hinge, latch or the like may be used for securing the handlebar mount 40 to the bicycle handlebar 44. A video camera 46 is provided on the handlebar mount 40. A portion of the video camera 46 is disposed within the handlebar mount 40. The lens of the video camera 46 is directed to an area in front of the bicycle handlebar 44. The video camera 46 is used to generate a video signal representative of an area in front of the bicycle and the bicycle handlebar 44. In this embodiment, the video camera 46 is not incorporated into the bicycle handlebar 44.

Also provided with the handlebar mount 40 is a flexible shaft 48. The flexible shaft 48 may include a proximal end and a distal end. The proximal end of the flexible shaft 48 is coupled to the handlebar mount 40. The flexible shaft 48 may be configured to extend toward the area in front of the bicycle handlebar 44. The flexible shaft 48 connects the video display 42 to the handlebar mount 40. In this regard, the distal end of the flexible shaft 48 is coupled to the video display 42. The flexible shaft 48 may be configured to bend and maneuver to adjust the positioning of the video display 42. Positioning the video display 42 in an area in front of the handlebar 44 facilitates the riding position of the bicyclist enabling the bicyclist to look downward toward the video display 42 rather than straight ahead at an elevated head position.

For races or time trials, the position facilitated by the handlebar mount 40 may produce better results due to the improvement in aerodynamic efficiency. The lowered head position may maximize the aerodynamic efficiency by enabling a streamlined position. Additionally, the farther forward the center of mass of the combined bicycle and bicyclist, the less the front wheel has to move laterally in order to maintain balance. Conversely, the further back the center of mass is located, the more front wheel lateral movement or bicycle forward motion will be required to regain balance. Therefore, the lowered head position facilitated by the handlebar mount 40 minimizes the lateral movement associated with the front wheel of the bicycle. The bicycle handlebar mount 40 includes a battery (not shown) used to power the video camera 46 and the video display 42. Furthermore, the bicycle handlebar mount 40 includes an on/off switch (not shown) for the video camera 46 and the video display.

Viewing the video display 42 connected to the handlebar mount 40 by the flexible shaft 48 encourages the bicyclist to lower his head position. The video display 42 is configured to immediately display the real time images captured by the video camera 46. Thus, the bicyclist does not jeopardize the line of sight or peripheral vision associated with a less streamlined elevated head position. The streamlined lowered head position reduces the advantage of competitors using a slipstream strategy in races.

Figure 5:
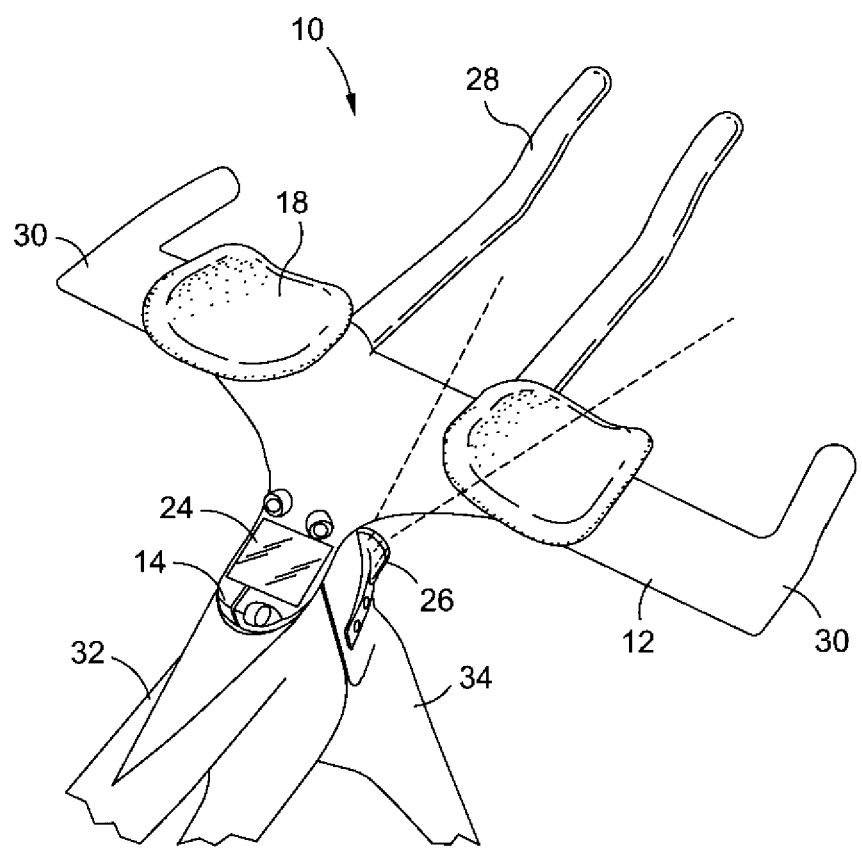
FIG. 5 is a perspective view of the bicycle video system with a video camera coupled to a bicycle frame.

Referring briefly to FIG. 5, the bicycle video system 10 is provided. In this embodiment, the video camera 26 may be coupled to the front fork 34 of the bicycle frame 32. The video display 24 may be coupled to the handlebar stem 14 of the bicycle handlebar 12. The video display 24 is in electrical communication with the video camera 26. The video display 24 may provide images generated by the video camera 26 and transmitted as a video signal.

The above description is given by way of example, and not limitation. Given the above disclosure, one skilled in the art could devise variations that are within the scope and spirit of the invention disclosed herein, including various ways of embodying a video system on a bicycle for maximizing the aerodynamic efficiency of a bicyclists' riding position on a bicycle. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A bicycle with a front viewing video system, the bicycle comprising:
   a front steering assembly of the bicycle;
   a video display coupled to the front steering assembly of the bicycle, the video display being oriented in an upward direction and positioned below an upper portion of the front steering assembly so that a rider is tucking into a lowered head position; and
   a video camera coupled to the front steering assembly, a forward line of sight of the video camera being directed toward an area in front of the front steering assembly, a lens of the video camera being positioned below the upper portion of the front steering assembly;
   wherein the video display is in communication with the video camera for receiving a signal representative of a real-time image generated by the video camera so that the rider in a lowered head position is maintaining view of the area in front of the bicycle handlebar with the video display.

2. The bicycle of claim 1, wherein the video camera is centered on the front steering assembly so that a view of the area in front of the front steering assembly closely resembles a view the rider would have with an elevated head position.

3. The bicycle of claim 2, wherein the front steering assembly includes a bicycle handlebar, and the video camera is positioned on the bicycle handlebar at a point generally equidistant between a first end and a second opposing end of the bicycle handlebar.

4. The bicycle of claim 1, wherein the front steering assembly is a handlebar or a bicycle handlebar stem.

5. The bicycle of claim 4, wherein the forward line of sight of the video camera is orthogonal to a longitudinal axis of the handlebar.

6. The bicycle of claim 1, wherein the video camera is mounted midway a width of the front steering assembly.

7. The bicycle of claim 1, wherein the video display is pivotally coupled to the bicycle handlebar.

8. The bicycle of claim 1, wherein the video display is configured to receive a continuous signal representative of real-time images generated by the video camera.

9. A bicycle with a front viewing video system, comprising:
   a front steering assembly;
   a video camera directly attached to the front steering assembly, a forward line of sight of the video camera being positioned toward an area in front of the bicycle handlebar, a lens of the video camera being positioned below the upper portion of the front steering assembly;
   a flexible shaft extending from the front steering assembly, the flexible shaft having a proximal end and a distal end, the proximal end of the flexible shaft being coupled to the front steering assembly; and
   a video display coupled to the distal end of the flexible shaft, the video display being oriented in an upward direction and positioned below an upper portion of the front steering assembly so that a rider is tucking into a lowered head position, the video display being in communication with the video camera for receiving a signal representative of a real-time image generated by the video camera so that the rider in a lowered head position is maintaining view of the area in front of the bicycle handlebar with the video display.

10. The system of claim 9, wherein the front steering assembly includes a handlebar and a handle bar mount wherein the handlebar mount is a clamp with the video camera attached to the clamp.

11. The system of claim 9, wherein the position of the video display is adjustable via the flexible shaft.

12. A method of displaying a real-time image generated by a video camera coupled to a bicycle and a video display coupled to a front steering assembly, the method comprising the steps of:
   mounting the video camera so that a lens and a video display of the video camera is disposed below an upper portion of the front steering assembly so that a rider is tucking into a lowered head position;
   positioning a forward line of sight of the video camera in an area in front of the front steering assembly;
   optically sensing a scene in front of the front steering assembly using the video camera coupled to the bicycle;
   transmitting a video signal from the video camera to the video display; and
   displaying the real-time image on the video display in response to receiving the video signal from the video camera so that the rider in a lowered head position is maintaining view of the area in front of the bicycle handlebar with the video display.

13. The method of claim 12, wherein the video camera is disposed within the bicycle handlebar.

14. The method of claim 12, wherein the video camera is housed in a mount affixed to the bicycle handlebar.

15. The method of claim 12, wherein the video display is disposed on the bicycle handlebar equidistant from a pair of handlebar grips.

16. The method of claim 12, wherein the video display is connected via a flexible stem to a mount affixed to the bicycle handlebar.

17. The method of claim 12, wherein a position of the video display is adjustable.

18. A front viewing video system mountable to a bicycle, comprising:
- a video display mountable to a front steering assembly of the bicycle in an upward direction, the video display being positioned below an upper portion of the front steering assembly so that the rider is tucking into a lowered head position; and
- a video camera mountable to the front steering assembly of the bicycle with a forward line of sight of the video camera being directed toward an area in front of the front steering assembly, a lens of the video camera being positioned below the upper portion of the front steering assembly so that the rider is tucking into the lowered head position;
- wherein the video display is communicable with the video camera for receiving a signal representative of a real-time image generated by the video camera so that the rider in a lowered head position is maintaining view of the area in front of the bicycle handlebar with the video display.

* * * * *